United States Patent
Hirayama (10) Patent No.: US 11,153,546 B2
(45) Date of Patent: Oct. 19, 2021

(54) LOW-LIGHT IMAGING SYSTEM

(71) Applicant: Axis AB, Lund (SE)

(72) Inventor: Shingo Hirayama, Tokyo (JP)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/098,932

(22) Filed: Nov. 16, 2020

(65) Prior Publication Data

US 2021/0203901 A1 Jul. 1, 2021

(30) Foreign Application Priority Data

Dec. 30, 2019 (EP) .................................... 19219965

(51) Int. Cl.
*H04N 9/68* (2006.01)
*H04N 5/33* (2006.01)
*H04N 7/18* (2006.01)
*H04N 9/07* (2006.01)

(52) U.S. Cl.
CPC ................. *H04N 9/68* (2013.01); *H04N 5/33* (2013.01); *H04N 7/18* (2013.01); *H04N 9/07* (2013.01)

(58) Field of Classification Search
CPC .. H04N 9/68; H04N 5/33; H04N 7/18; H04N 9/07
USPC .................................................. 348/149, 148
See application file for complete search history.

(56) References Cited

U.S. PATENT DOCUMENTS

| 8,050,456 | B2* | 11/2011 | Nakamori | G06K 9/4652 |
| | | | | 382/103 |
| 8,446,470 | B2* | 5/2013 | Lu | H04N 5/332 |
| | | | | 348/148 |
| 10,530,995 | B2* | 1/2020 | Douady-Pleven | H04N 5/357 |
| 2005/0069197 | A1 | 3/2005 | de Queiroz et al. | |
| 2011/0176176 | A1 | 7/2011 | Sakai | |
| 2015/0294167 | A1 | 10/2015 | Zhang et al. | |
| 2018/0255256 | A1 | 9/2018 | Park et al. | |
| 2018/0302575 | A1 | 10/2018 | Lu et al. | |

FOREIGN PATENT DOCUMENTS

| CN | 108989783 A | 12/2018 |
| EP | 2913993 A1 | 9/2015 |
| WO | 2009/026966 A1 | 3/2009 |

OTHER PUBLICATIONS

Extended European Search Report dated May 20, 2020 for the European Patent Application No. 19219965.1.

* cited by examiner

*Primary Examiner* — Trang U Tran
(74) *Attorney, Agent, or Firm* — Volpe Koenig (57) ABSTRACT

A traffic monitoring system generates a low-light image of a set of. The traffic system comprises a camera and a processing unit. The camera generates a first image comprising a set of pixels, each pixel comprising colour encoding values corresponding to a pixel colour, a saturation value, and a luma value. The processing unit is configured to, for each pixel corresponding to a first set of colours, reducing the saturation value of the pixel, and where the pixel colour corresponds to red and where the luma value of the pixel is below a first threshold, reducing the saturation value of the pixel, where the pixel colour corresponds to red and where the luma value of the pixel is equal to or above the first threshold, preserve the saturation value of the pixel, and generate the low-light image based on the modified colour encoding values of the first image.

15 Claims, 5 Drawing Sheets

LOW-LIGHT IMAGING SYSTEM

BACKGROUND

A well-known camera configuration for imaging both well-lit scenes (e.g. daytime scenes) and low-light scenes (e.g. night-time scenes) is that of a camera with a removable IR (infra-red) cut filter. The IR cut filter is a filter that removes light having a wavelength of greater than 700 nm (e.g. near infra-red or NIR light). The IR cut filter may be employed for imaging daytime scenes where NIR light can affect the imaging sensor and make accurate capture of visible colours more difficult. For imaging a low-light scene, accurate colour representation may be difficult or impossible. Therefore, priority is instead given to capturing as much light as possible and the IR cut filer is removed. This ensures that the amount of light reaching the light sensor is maximised.

In one important use case for low-light cameras, night-time traffic scenes are imaged to capture and record vehicle movement through the scene. As the vehicles moving through the scene will often be responding to traffic signalling lights, the light emitted from the traffic signalling lights should also be accurately captured by the low-light camera. However, given the difficulty in accurately imaging colours in low-light scenes, a method is needed to improve the processing of low-light camera images to accurately determine traffic signalling light colours.

US patent application publication 2015/294167A1 describes a method for detecting traffic lights by converting a colour image into a monochrome scale image; converting the first monochrome scale image into a first binary image; identifying a first set of candidate blobs in the first binary image based on at least one predetermined geometric parameter; and identifying a green traffic light using a green traffic light classifier.

PCT patent application 2009/026966 A1 describes a method of determining the difference in luminance of an image and a corresponding background image and also determining the difference in chrominance of the image and the corresponding background image and changing the luminance of the background image accordingly.

US patent application publication 2018/302575 A1 describes a vehicular night vision system with a red-pass spectral filter over a first set of pixels, a blue-pass spectral filter over a second set of pixels, a green-pass spectral filter over a third set of pixels, and each pixel of a fourth set of pixels senses at least near infrared radiation. A near infrared illumination source is operable to emit non-visible near infrared illumination to enhance night-time viewing by the camera.

SUMMARY

A first aspect of the disclosure is a method of generating a low-light image, the method comprising the steps of: capturing a first image comprising a set of pixels, each pixel of the set of pixels having a pixel colour defined by colour encoding values comprising a saturation value and a luma value, for each pixel of the set of pixels: where the pixel colour corresponds to one of a first set of colours, modifying the colour encoding values to reduce the saturation value of the pixel, and where the pixel colour corresponds to one of a second set of colours and where the luma value of the pixel is below a first threshold value, modifying the colour encoding values to reduce the saturation value of the pixel, wherein the second set of colours consisting of at least one colour, and wherein the colours in the second set are not comprised in the first set of colours, where the pixel colour corresponds to one of the second set of colours and where the luma value of the pixel is equal to or above the first threshold value, preserving the saturation value of the pixel, generating the low-light image in dependence on the modified colour encoding values of the first image.

Optionally, the first set of colours comprises blue and green. The first set of colours may further comprise cyan, magenta, and yellow. The second set of colours may comprise red. Alternatively, the first set of colours further comprises blue, cyan, magenta, and yellow and the second set of colours comprises red and green.

The first image may be generated in dependence on a light received at an image sensor and wherein the light includes infrared light. The infrared light may have a wavelength of between 700 nm and 1000 nm.

The colour encoding values may correspond to a YUV colour encoding system and the pixel colour may be determined in dependence on a set of chrominance values of the colour encoding values. The step of reducing the saturation value of the pixel may comprise reducing the chrominance values of the colour encoding values. Furthermore, the step of reducing the saturation value of the pixel may comprise setting the chrominance values of the colour encoding values to zero.

A second aspect of the disclosure is a non-transitory computer readable medium having computer code instructions stored thereon which, when executed by the processing unit of the imaging unit of the below aspect, are adapted to perform the above method.

A third aspect of the disclosure is an imaging unit for generating a low-light image, the imaging unit comprising a camera and a processing unit, wherein: the camera being configured to generate a first image comprising a set of pixels, each pixel of the set of pixels having a pixel colour defined by colour encoding values comprising a saturation value and a luma value, and the processing unit being configured to, for each pixel of the set of pixels: where the pixel colour corresponds to one of a first set of colours, modify the colour encoding values to reduce the saturation value of the pixel, and where the pixel colour corresponds to one of a second set of colours and where the luma value of the pixel is below a first threshold value, modify the colour encoding values to reduce the saturation value of the pixel, wherein the second set of colours consisting of at least one colour, and wherein the colours in the second set are not comprised in the first set of colours, where the pixel colour corresponds to one of the second set of colours and where the luma value of the pixel is equal to or above the first threshold value, preserve the saturation value of the pixel, and generate the low-light image in dependence on the modified colour encoding values of the first image.

The camera may comprise an image sensor, and the first image may be generated in dependence on a light received at an image sensor comprising infrared light. The infrared light may have a wavelength of between 700 nm and 1000 nm.

The colour encoding values may correspond to a YUV colour encoding system and the pixel colour may be determined in dependence on a set of chrominance values of the colour encoding values.

The processing unit may be configured to reduce the saturation value of the pixel by reducing the chrominance values of the colour encoding values. Furthermore, the processing unit may be configured to reduce the saturation value of the pixel by setting the chrominance values of the colour encoding values to zero.

A fourth aspect of the disclosure is a traffic monitoring system for generating a low-light image of a set of objects comprising at least one road and at least one traffic signalling light, the traffic monitoring system comprising a camera and a processing unit, wherein: the camera being configured to generate a first image comprising a set of pixels, each pixel of the set of pixels comprising colour encoding values corresponding to a pixel colour, a saturation value, and a luma value, and the processing unit being configured to, for each pixel of the set of pixels: where the pixel colour corresponds to one of a first set of colours, modify the colour encoding values to reduce the saturation value of the pixel, and where the pixel colour corresponds to red and where the luma value of the pixel is below a first threshold value, modify the colour encoding values to reduce the saturation value of the pixel, where the pixel colour corresponds to red and where the luma value of the pixel is equal to or above the first threshold value, preserve the saturation value of the pixel, and generate the low-light image of the set of objects in dependence on the modified colour encoding values of the first image.

BRIEF DESCRIPTION OF THE DRAWINGS

Other features and advantages will become apparent from the following detailed description of an example, with reference to the accompanying drawings, in which.

DESCRIPTION

The present description relates to apparatus and techniques for providing improved low-light imaging of a scene. Throughout the description, the same reference numerals are used to identify corresponding elements.

Figure 1:
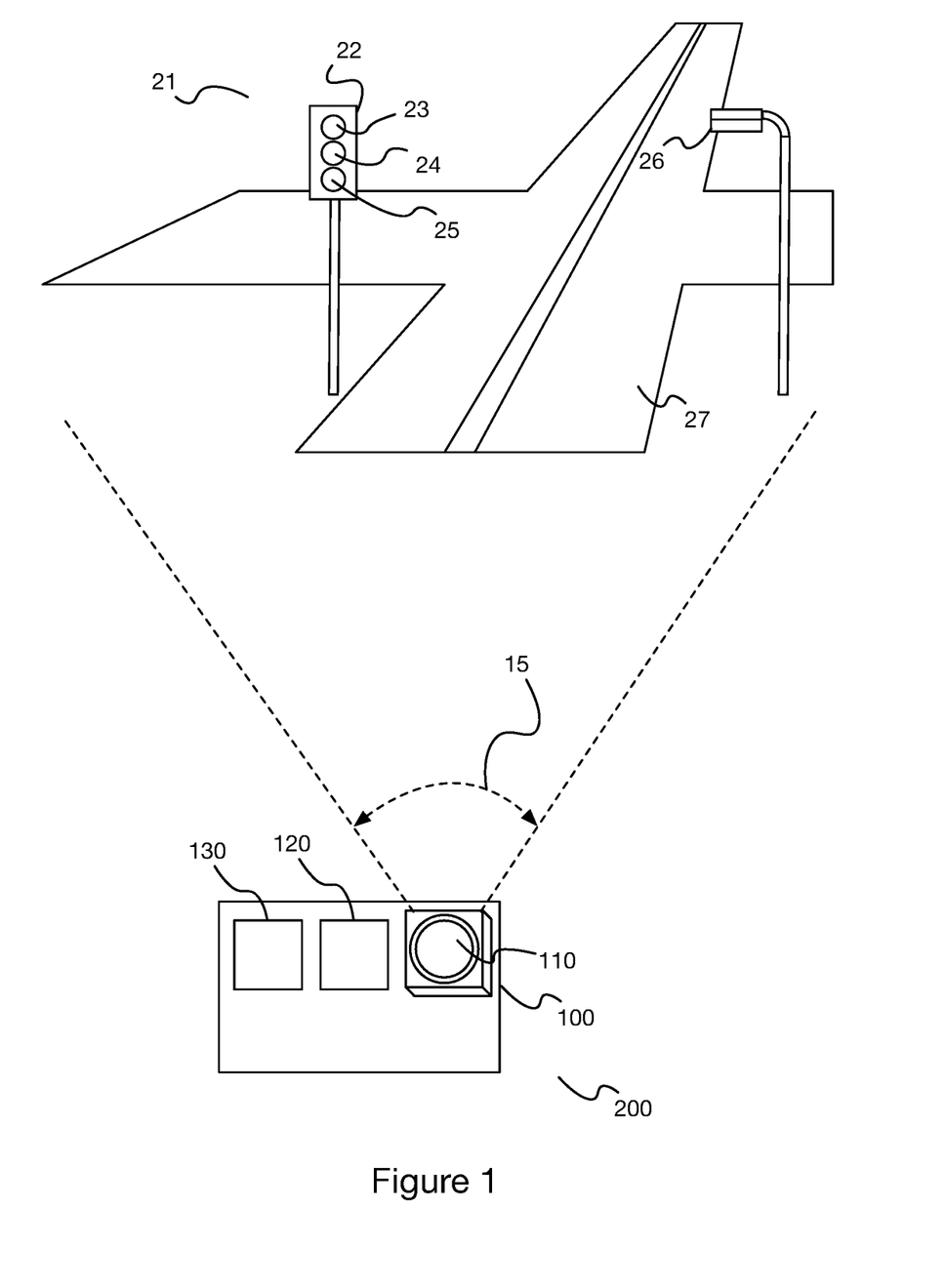
FIG. 1 is a diagram of an imaging apparatus and a set of objects to be imaged.

FIG. 1 is a diagram of an example of an imaging unit 100 and a traffic scene 21. In one example, imaging unit 100 is part of a traffic monitoring system 200. Imaging unit 100 comprises a camera 110, processing unit 120, and may further comprise a non-transitory computer readable medium 130. Camera 110 has a field of view 15 and an image sensor configured to generate a first image 20 in dependence on a light received at the image sensor. The image sensor may comprise one or a combination of a visible light sensor (e.g. a semiconductor charge-coupled devices (CCD), an active pixel sensor in complementary metal-oxide-semiconductor (CMOS), or an N-type metal-oxide-semiconductor (NMOS, Live MOS) sensor). The field of view (FOV) 15 of camera 110 is defined as the angle through which the camera 110 can pick up the light. The field of view is dependent on the size of the image sensor and a focal length of the lens used with the image sensor. The field of view 15 of camera 110 may cover traffic scene 21. For the present examples, the light is understood to have a wavelength of between at least 300 nm and 1000 nm. However, other examples may include artificial lights having restricted spectrums.

Camera 110 may optionally further comprise an infra-red cut filter. The infra-red cut filter may be fixed or removable, either automatically or manually. In one example, the infra-red cut filter may be automatically removed in response to a low-light condition detected by imaging unit 100 in order to allow improved low-light imaging by camera 110. The infra-red cut filter may be configured to filter light having a wavelength of greater than 700 nm. In one example, the infra-red cut filter is configured to filter light having a wavelength of between 700 nm and 1000 nm, i.e. near infrared (NIR) light.

Processing unit 120 is configured to receive the first image 20 from the image sensor and perform one or more image processing steps to generate a low-light image 10 from first image 20. The one or more image processing steps may comprise the adjustment of pixel values for one or more of the pixels of first image 20 in order to generate low-light image 10. The processing unit 120 has been described as a single unit but may be configured as separate controllers or modules. The separate processing units or modules can be specialized controllers for e.g. processing the videos and images, or general controllers or modules that can control more than one component. The processing unit 120, or the specialized modules or controllers, may be at least partially implemented by software executed by a central processing unit (CPU). In an example, a computer program product comprising instructions which, when the program is executed by a computer, cause the computer to carry out steps as discussed above in relation to the processing unit 120. The processing unit may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction but serve as another element/means when executing another instruction. In addition, one element/means may be implemented by one instruction in some cases, but by a plurality of instructions in some other cases. Naturally, it is conceivable that one or more elements (means) are implemented entirely by analogue hardware components.

The processing unit may include one or more processing units, e.g. a CPU ("Central Processing Unit"), a GPU ("Graphics Processing Unit"), an AI accelerator chip, a DSP ("Digital Signal Processor"), an ASIC ("Application-Specific Integrated Circuit"), a scaler, a DDIC (display driver integrated circuit), discrete analogue and/or digital components, or some other programmable logical device, such as an FPGA ("Field Programmable Gate Array"). The processing unit may further include a system memory (e.g. non-transitory computer readable medium 130) and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The processing unit may include one or more communication interfaces, such as a serial interface, a parallel interface, a USB interface, a wireless interface, a network adapter, etc, as well as one or more data acquisition devices, such as an A/D converter. The special-purpose software may be provided to the processing unit on any suitable computer-readable medium, including a record medium, and a read-only memory.

Although the description may refer to a 'traffic scene' or a 'traffic monitoring system', it is understood that the methods and apparatus described herein may be applied to all forms and applications of low-light imaging, and are not restricted to the imaging of low-light traffic scenes.

In an example of a traffic scene shown in FIG. 1, traffic scene 21 comprises a set of objects that include a traffic signalling light 22, a streetlamp 26, and a road surface 27. Traffic signalling light 22 is arranged to provide a clear visual signal to vehicles travelling on road surface 27. In this example, traffic signalling light 22 is configured to visually indicate at least the following signals to vehicles travelling on road surface 27: STOP and PROCEED. Traffic signalling light 22 may comprise red light 23 which, when lit, visually signals the instruction "STOP" to vehicles. Traffic signalling light 22 may also comprise green light 25 which, when lit, visually signals the instruction "PROCEED" to vehicles. Finally, traffic signalling light 22 may comprise orange light 24 which, when lit, visually signals "CAUTION" to vehicles. In this example, the set of objects further comprise streetlamp 26, which is configured to provide general lighting to traffic scene 21 using visual wavelengths, e.g. white or yellow light. Finally, traffic scene 21 may comprise a set of reflective surfaces which reflect any of the active light sources within traffic scene 21 (e.g. red light 23, orange lights 24, green light 25, or streetlamp 26) or light from outside of traffic scene 21. The reflective surfaces may include road surface 27, e.g. when wet from rain.

Figure 2:
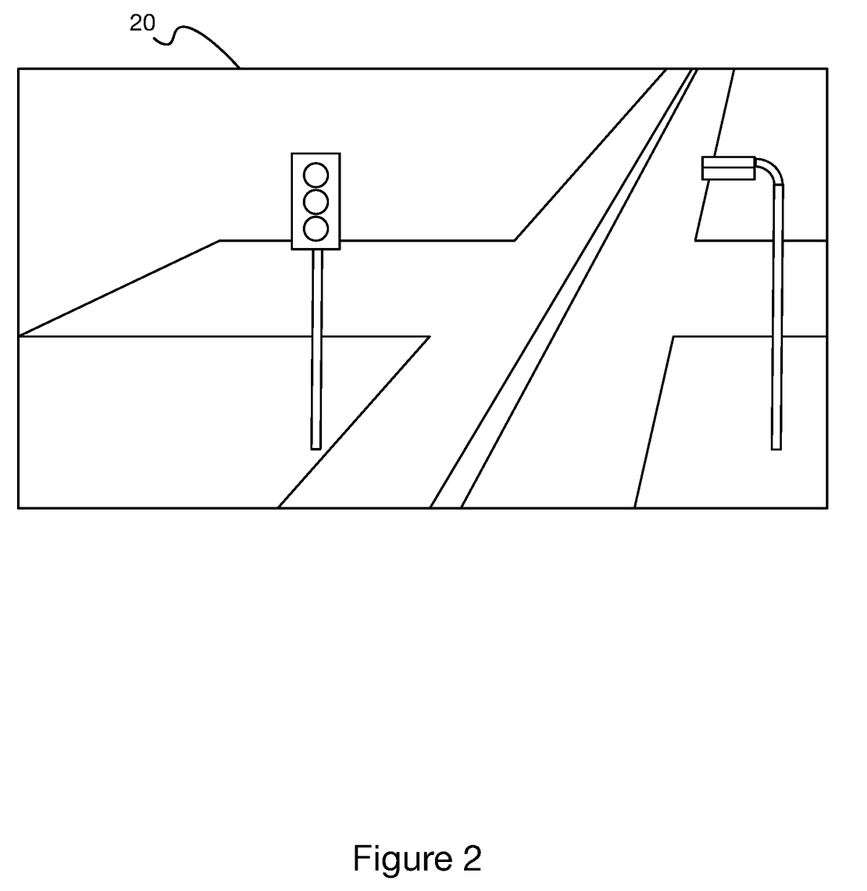
FIG. 2 is a representation of an image of the set of objects captured by an image sensor of the imaging apparatus.

FIG. 2 depicts a first image 20 as generated by the image sensor in dependence on a light received at the image sensor. As described above, the light may include near infrared light. First image 20 is comprised of a set of pixels comprising a plurality of pixels. Each pixel has a colour value defined by a colour encoding value. The colour encoding value may be encoded according to a YUV colour coding system in which the pixel colour is determined in dependence on a set of chrominance values. The YUV (or Y'UV) model defines a colour space in terms of one luma (or luminance) value (Y') and two chrominance values, called U value (blue projection) and V value (red projection) respectively.

A saturation value (alternatively described as a chrominance value) of a pixel may be controlled by adjusting the U And V values of the pixel. The higher (or the lower when negative) the U and V values are, the more saturated (i.e. colourful) the pixel gets. The closer the U and V values get to zero, the greyer the pixel becomes.

In alternative examples, alternative colour coding systems are used (e.g. YCbCr) and corresponding pixel colour processing steps are applied to achieve a corresponding reduction of saturation as described herein.

Figure 3:
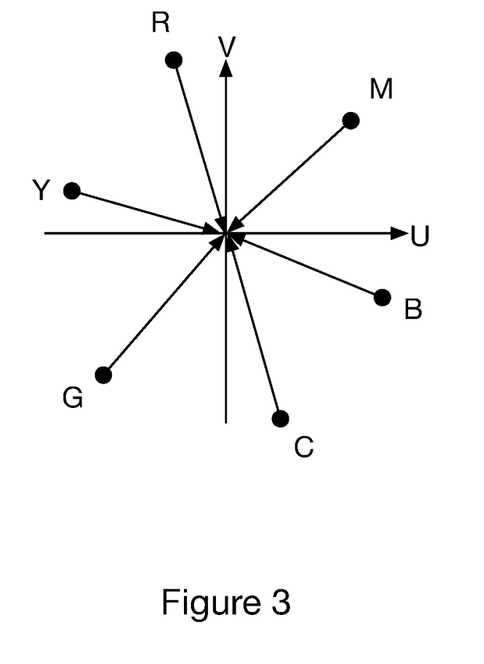
FIG. 3 is a colour space diagram showing a colour processing step for an image captured by the imaging apparatus.
Figure 4:
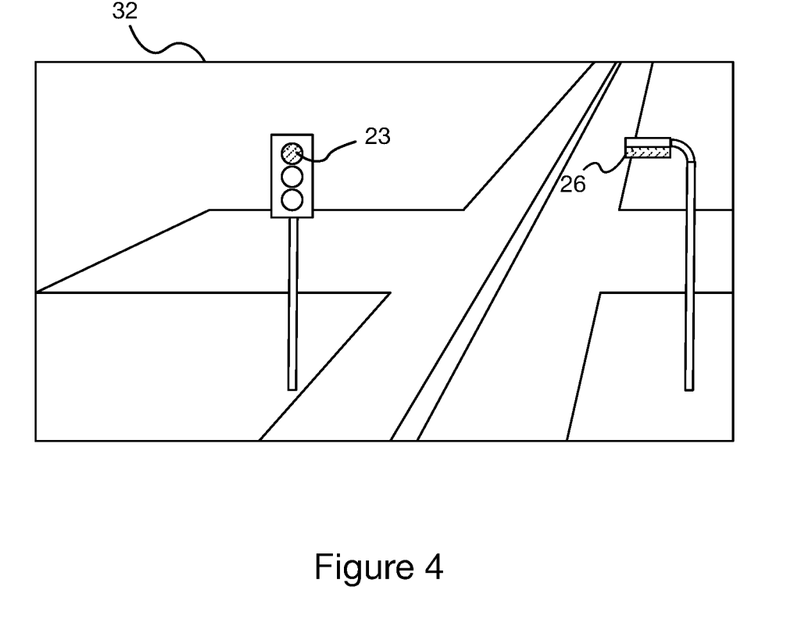
FIG. 4 is a representation of a low-light image processed according to the colour processing step of FIG. 3.

FIG. 3 depicts a technique for reducing the saturation of the set of pixels to produce a monochrome processed image 32 shown in FIG. 4. In FIG. 3, the chrominance values U and V of a pixel are shown as the X and Y axis respectively. An example red pixel is marked R, an example green pixel is marked G, an example blue pixel is marked B, an example yellow pixel is marked Y, an example magenta pixel is marked M, and an example cyan pixel is marked C. In the example of FIG. 3, each of the U,V values of the pixel are moved closer to the origin of the graph, reducing the colour in the image. In one example, each of the U,V values are moved to the origin itself, leaving an entirely monochrome image. FIG. 4 shows monochrome processed image 32 in which the U,V values of each pixel of first image 20 has been reduced to zero. In FIG. 4, both streetlamp 26 and red light 23 are lit. However, due to lack of colour in processed image 32, it is not possible to differentiate between these light sources based on colour alone. This scenario may be particularly disadvantageous where it is important to differentiate between light emitted from red light 23, orange light 24, and green light 25 and where first image 20 is insufficiently high resolution or clearly focused to allow differentiation between the lights based on position alone. In this scenario, it might be difficult or impossible to determine which of the traffic signals is being transmitted by traffic signalling light 22.

Figure 5:
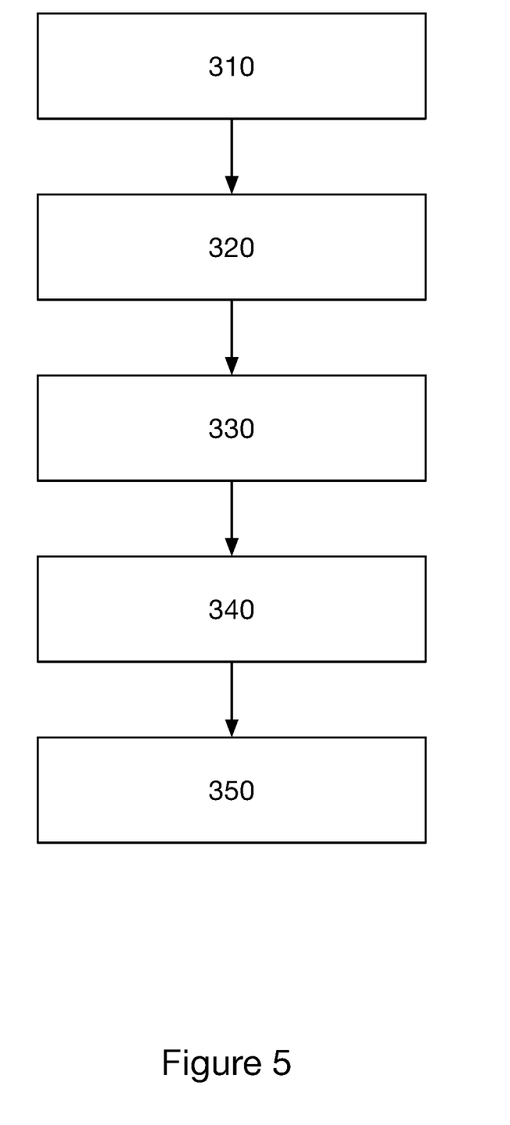
FIG. 5 is a flowchart of a low-light image processing method.

FIG. 5 is a flowchart of the low-light image processing method according to one example of the description that overcomes the disadvantages of the above described configuration. In one example, each of the following steps are carried out by processing unit 120 of imaging unit 100 on first image 20.

In step 310, a first image 20 is generated by an image sensor in dependence on a light received at the image sensor. First image 20 comprises a set of pixels comprising a plurality of pixels, each pixel comprising colour encoding values corresponding to a colour encoding scheme, e.g. those described with reference to FIGS. 2, 3, and 4. In this example, the colour encoding values comprise a saturation value, describing a pixel colour of the pixel, and a luma value.

Figure 6:
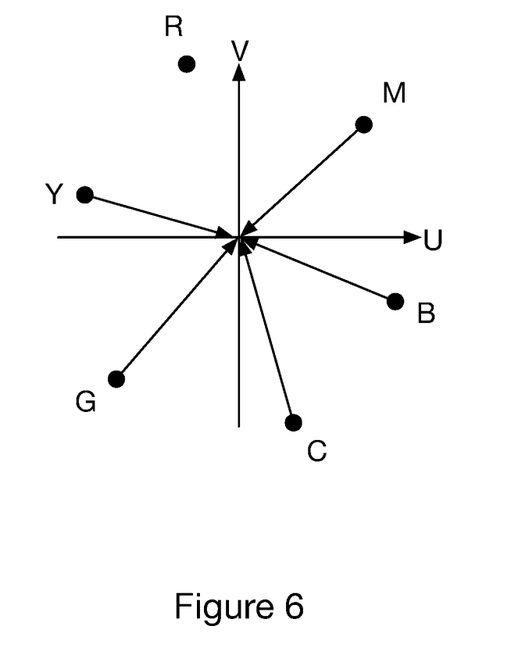
FIG. 6 is a colour space diagram showing a colour processing step for an image.

In step 320, the set of pixels of first image 20 are processed so that the saturation value (e.g. the U,V values as shown in the example of FIG. 6) is reduced for each pixel having a colour corresponding to one of a first set of colours. In one example, the saturation value is reduced to zero for each pixel having a colour corresponding to one of a first set of colours. In one example, the first set of colours comprise all colours except red. i.e. All pixels that do not correspond to a red colour in first image 20 are updated to reduce their saturation value. In one example in which U and V values have a possible range of −0.5 to +0.5, a pixel having a saturation value corresponding to a U value of below −0.4 and a V value of greater than +0.4 is defined as being 'red'. However, depending on average light levels, average saturation of the image, and/or interference from other light sources, the tolerances of what may define 'red' can vary. In another example, a pixel having a saturation value corresponding to a U value of below −0.25 and a V value of greater than +0.25 is defined as being 'red'. Where only a limited set of colours are expected from an image (e.g. an image of a traffic signalling light alone), the definition of what might be considered a 'red' colour can be further expanded, since the green and yellow pixels will have quite different values from the red pixels. The range of U and V values used to define a 'red' colour could also vary depending on the threshold for the luma value, as described below. These concepts may be equivalently applied to other colours.

In another example in which the colour encoding scheme is an RGB colour encoding scheme, the first set of colours consist of comprises blue and green. In another example in which the colour encoding scheme is an RGBCMY colour encoding scheme, the first set of colours consist of blue, green, cyan, magenta, and yellow. The resulting image is an image comprising pixels that are either greyscale or red. However, greyscale/red image may still be difficult to use for accurately detecting red traffic signalling lights, as a significant number of red light sources may also exist within traffic scene 21, including red light reflected from reflective surfaces, e.g. road surface 27 and even parts of traffic signalling light 22. In another example, the first set of colours comprise all colours except red and green. In another example, the first set of colours comprise all colours except red, green, and yellow. i.e. the colours used by the traffic signalling light.

In step 330, the set of pixels are processed so that the saturation value is reduced for each pixel having a colour corresponding to one of a second set of colours and a luma value below a first threshold value. The first threshold value may be set in dependence on how bright the imaged light sources are, and in particular, how bright the traffic signalling lights are. Furthermore, the first threshold value may be set in dependence on the degree to which light 'noise' from other bright lights can be tolerated. E.g. where the imaged traffic signalling lights are very bright, the threshold can be set high. Where a substantial amount of light noise exists in a scene, the threshold should also be set high to filter out the light noise. In one example, the second set of colours comprise red. i.e. All pixels that correspond to a red colour but have a luma value below a threshold are also updated to reduce their saturation value. In another example, the second set of colours comprise red and green. In another example, the second set of colours comprise red, green, and yellow.

In step 340, the set of pixels are processed so that the saturation value is preserved for each pixel having a colour corresponding to one of a second set of colours and a luma value above a first threshold value. In one example, the second set of colours comprise red. i.e. All pixels that correspond to a red colour and have a brightness above a threshold keep their red colour. In another example, the second set of colours comprise red and green. In another example, the second set of colours comprise red, green, and yellow. As this step may also comprise taking no action (i.e. preserving a value may comprise simply not updating it), this 'step' may also be treated as absent.

As described above, where a YUV colour encoding scheme is employed, a range of U and V values used to define a 'red' colour may also vary depending on the first threshold value. In one example, the larger the first threshold, the larger the range of U and V values used to define a 'red' colour. This provides the advantage of allowing a pixel falling within a broad definition of 'red' to be preserved as long as it is sufficiently bright, whilst dimmer red lights need to be closer to an ideal 'red' in order to be preserved. The same concept may be equivalently applied to other colour encoding schemes.

Similarly to the above, where a YUV colour encoding scheme is employed, the first threshold value may be dependent on a range of U and V values used to define a 'red' colour. Where a 'red' pixel colour is defined narrowly, a relatively low first threshold for the luma value may be set, but where a 'red' pixel colour is defined more broadly (e.g. more orangey reds are included), a relatively high first threshold for the luma value may be set. These values may be manually or automatically adjusted based on test images of the scene to be captured. Preferably, all desired traffic signalling lights should have their colour preserved, whilst limiting the amount of colour noise in the form of neon signs, reflective surfaces, etc.

Figure 7:
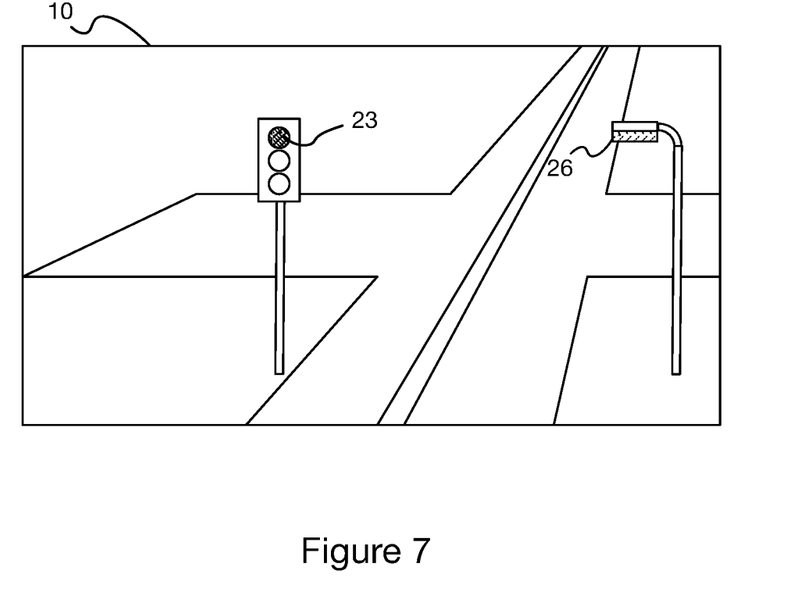
FIG. 7 is a representation of a low-light image processed according to the colour processing step of FIG. 6.

In step 350, low-light image 10 (depicted in FIG. 7) is generated in dependence on the output of the above steps. In an example in which the first set of colours comprise all colours except red and the second set of colours consists of red, low-light image 10 will comprise a mostly greyscale image but with red coloured pixels corresponding to bright red pixels in first image 20. As shown in FIG. 7, this will allow a clear differentiation between the red light 23 and streetlamp 26. Red light 23 (shading dark to indicate a red colour) will be shown as red while streetlamp 26 will remain monochrome. It will also allow a differentiation between red light 23 and a red coloured vehicle, that is not actively lit. This will allow a viewer to clearly discern a colour emitted by traffic signalling light 22. This may allow improved determination of traffic violations or liability in recorded images or videos of traffic incidents within traffic scene 21. Although the colour red is used in the above example, any colour or combination of colours can be employed. E.g. for observation and differentiation of blue lights, green lights, yellow lights etc. or any combination of colours.

The invention claimed is:

1. A method of generating a low-light image, the method comprising the steps of:
  capturing a first image comprising a set of pixels, each pixel of the set of pixels having a pixel colour defined by colour encoding values comprising a saturation value and a luma value,
for each pixel of the set of pixels:
  where the pixel colour corresponds to one of a first set of colours, modifying the colour encoding values to reduce the saturation value of the pixel, and where the pixel colour corresponds to one of a second set of colours and where the luma value of the pixel is below a first threshold value, modifying the colour encoding values to reduce the saturation value of the pixel, wherein the second set of colours consisting of at least one colour, and wherein the colours in the second set are not comprised in the first set of colours, where the pixel colour corresponds to one of the second set of colours and where the luma value of the pixel is equal to or above the first threshold value, preserving the saturation value of the pixel,
generating the low-light image in dependence on the modified colour encoding values of the first image.

2. The method according to claim 1, wherein the first set of colours comprises blue and green.

3. The method according to claim 2, wherein the first set of colours further comprises cyan, magenta, and yellow.

4. The method according to claim 1, wherein the second set of colours comprises red.

5. The method according to claim 1, wherein the first set of colours further comprises blue, cyan, magenta, and yellow and wherein the second set of colours comprises red and green.

6. The method according to claim 1, wherein the first image is generated in dependence on a light received at an image sensor and wherein the light includes infrared light.

7. The method according to claim 6, wherein the infrared light has a wavelength of between 700 nm and 1000 nm.

8. The method according to claim 1, wherein the colour encoding values correspond to a YUV colour encoding system and wherein the pixel colour is determined in dependence on a set of chrominance values of the colour encoding values.

9. The method according to claim 8, wherein the step of reducing the saturation value of the pixel comprises reducing the chrominance values of the colour encoding values.

10. The method according to claim 8, wherein the step of reducing the saturation value of the pixel comprises setting the chrominance values of the colour encoding values to zero.

11. An imaging unit for generating a low-light image, the imaging unit comprising a camera and a processing unit, wherein:
the camera being configured to generate a first image comprising a set of pixels, each pixel of the set of pixels having a pixel colour defined by colour encoding values comprising a saturation value and a luma value, and
the processing unit being configured to, for each pixel of the set of pixels:
where the pixel colour corresponds to one of a first set of colours, modify the colour encoding values to reduce the saturation value of the pixel, and
where the pixel colour corresponds to one of a second set of colours and where the luma value of the pixel is below a first threshold value, modify the colour encoding values to reduce the saturation value of the pixel, wherein the second set of colours consisting of at least one colour, and wherein the colours in the second set are not comprised in the first set of colours,
where the pixel colour corresponds to one of the second set of colours and where the luma value of the pixel is equal to or above the first threshold value, preserve the saturation value of the pixel, and
generate the low-light image in dependence on the modified colour encoding values of the first image.

12. The imaging unit according to claim 11, wherein camera comprises an image sensor, and wherein first image is generated in dependence on a light received at an image sensor comprising infrared light.

13. The imaging unit according to claim 12, wherein the infrared light has a wavelength of between 700 nm and 1000 nm.

14. A traffic monitoring system for generating a low-light image of a set of objects comprising at least one road and at least one traffic signalling light, the traffic monitoring system comprising an imaging unit configured to generate the low-light image of the set of objects in dependence on the modified colour encoding values of the first image; the imaging unit comprising a camera and a processing unit, wherein:

the camera is configured to generate a first image comprising a set of pixels, each pixel of the set of pixels having a pixel colour defined by colour encoding values comprising a saturation value and a luma value, and
the processing unit is configured to, for each pixel of the set of pixels:
where the pixel colour corresponds to one of a first set of colours, modify the colour encoding values to reduce the saturation value of the pixel, and
where the pixel colour corresponds to one of a second set of colours and where the luma value of the pixel is below a first threshold value, modify the colour encoding values to reduce the saturation value of the pixel, wherein the second set of colours consisting of at least one colour, and wherein the colours in the second set are not comprised in the first set of colours,
where the pixel colour corresponds to one of the second set of colours and where the luma value of the pixel is equal to or above the first threshold value, preserve the saturation value of the pixel, and
generate the low-light image in dependence on the modified colour encoding values of the first image.

15. A non-transitory computer readable medium having computer code instructions stored thereon which, when executed by a processing unit, are adapted to perform a method of generating a low-light image, the method comprising the steps of:
capturing a first image comprising a set of pixels, each pixel of the set of pixels having a pixel colour defined by colour encoding values comprising a saturation value and a luma value, for each pixel of the set of pixels:
where the pixel colour corresponds to one of a first set of colours, modifying the colour encoding values to reduce the saturation value of the pixel, and
where the pixel colour corresponds to one of a second set of colours and where the luma value of the pixel is below a first threshold value, modifying the colour encoding values to reduce the saturation value of the pixel, wherein the second set of colours consisting of at least one colour, and wherein the colours in the second set are not comprised in the first set of colours,
where the pixel colour corresponds to one of the second set of colours and where the luma value of the pixel is equal to or above the first threshold value, preserving the saturation value of the pixel,
generating the low-light image in dependence on the modified colour encoding values of the first image.

* * * * *